US007339294B2

(12) United States Patent
Oohashi et al.

(10) Patent No.: US 7,339,294 B2
(45) Date of Patent: Mar. 4, 2008

(54) VEHICULAR STARTING AND CHARGING ROTARY ELECTRIC MACHINE

(75) Inventors: Atsushi Oohashi, Tokyo (JP); Katsuhiko Kusumoto, Tokyo (JP); Hideki Morikaku, Tokyo (JP); Yoshinobu Utsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,801

(22) Filed: Aug. 19, 2002

(65) Prior Publication Data

US 2003/0034703 A1 Feb. 20, 2003

(30) Foreign Application Priority Data

Aug. 20, 2001 (JP) ......................... P. 2001-248996

(51) Int. Cl.
*H02K 7/00* (2006.01)

(52) U.S. Cl. ..................... 310/68 B; 310/239; 310/263

(58) Field of Classification Search ................ 310/263, 310/201, 208, 68 B, 239, 113; 290/46-49, 290/10, 14, 22, 27, 31, 36 R
See application file for complete search history.

(56) References Cited

U.S. PATENT DOCUMENTS 3,603,824 A * 9/1971 Csaki .......................... 310/71
4,110,676 A * 8/1978 Edick et al. .................. 322/31
4,403,402 A * 9/1983 Tomite et al. ................ 29/598
4,529,903 A * 7/1985 Takahashi et al. ..... 310/156.33
4,613,761 A * 9/1986 Yabunaka ................. 290/36 R
4,694,654 A * 9/1987 Kawamura .................... 60/597
4,705,971 A * 11/1987 Nagasaka .................... 310/12
4,948,997 A * 8/1990 Ohmitsu et al. ............ 310/113
4,959,577 A * 9/1990 Radomski ................... 310/263
5,075,616 A * 12/1991 Mitsui ......................... 322/10
5,093,591 A * 3/1992 Kitamura et al. ............. 310/62
5,124,602 A * 6/1992 Nishimura et al. ....... 310/68 B
5,132,604 A * 7/1992 Shimane et al. .............. 322/10
5,237,230 A * 8/1993 Sugiyama et al. .......... 310/113
5,280,222 A * 1/1994 von der Heide et al. ... 318/138

(Continued)

FOREIGN PATENT DOCUMENTS

EP 0 391 386 A 10/1990

(Continued)

OTHER PUBLICATIONS

Merriam-Webster's Collegiate Dictionary, tenth edition, p. 607.*
European Search Report dated Feb. 28, 2006.

*Primary Examiner*—Dang Le
(74) *Attorney, Agent, or Firm*—Sughrue Mion, PLLC

(57) ABSTRACT

A vehicular starting and charging rotary electric machine includes a rotor, a stator, brackets, a brush, and a rotation detection sensor. The rotor has a field winding. The stator has a stator winding. The brackets supports the rotor and the stator. One end of the brush is brought into contact with the rotor to supply field current to the field winding of the rotor. The rotation detecting sensor is arranged coaxially with a rotating shaft of the rotor, for detecting a state of the rotor and functioning as a motor or a generator. The magnetic pole position detecting sensor is integrally fixed to the bracket.

7 Claims, 17 Drawing Sheets

U.S. PATENT DOCUMENTS 5,517,067 A * 5/1996 Sata .......................... 310/68 B
5,627,422 A * 5/1997 Boggs et al. ............... 310/105
5,661,356 A * 8/1997 Fisher et al. ................ 310/219
5,663,631 A * 9/1997 Kajiura et al. ................ 322/29
5,917,248 A * 6/1999 Seguchi et al. ............... 290/31
5,936,322 A * 8/1999 Yamaguchi et al. ... 310/156.19
5,955,807 A * 9/1999 Kajiura et al. ......... 310/156.66
5,965,965 A * 10/1999 Umeda et al. ................ 310/52
5,990,591 A * 11/1999 Yamaguchi et al. ... 310/156.53
6,184,647 B1 * 2/2001 Oguro et al. ............... 318/727
6,225,715 B1 * 5/2001 Hoda et al. ............... 310/67 R
6,268,669 B1 * 7/2001 Wakao et al. ............. 310/67 R

FOREIGN PATENT DOCUMENTS

| | | | |
|---|---|---|---|
| JP | 61-189166 | * | 8/1986 |
| JP | 8-14145 | | 1/1996 |
| JP | 8-251889 | A | 9/1996 |
| JP | 9-324668 | A | 12/1997 |
| JP | 11-41887 | A | 2/1999 |
| JP | 11-164504 | A | 6/1999 |
| WO | WO 02/060711 | | 8/2002 |

* cited by examiner

3

32A

VEHICULAR STARTING AND CHARGING ROTARY ELECTRIC MACHINE

BACKGROUND OF THE INVENTION

1. Field of the Invention

The present invention relates to a vehicular starting and charging rotary electric machine integrating a starting motor and a charging generator.

2. Description of the Related Art

FIG. 19 is a sectional view showing a vehicular starting and charging rotary electric machine disclosed in, for example, JP-A-8-14145. In the drawing, a motor generator 1 includes a rotor 2 wound with a field winding 2*a,* a stator 3 wound three-phase stator winding 3*a,* front bracket 4 and rear bracket 5 containing the rotor 2 and stator 3, and a magnetic pole position detecting sensor 6 detecting a magnetic pole position of the rotor 2.

The rotor 2 includes a rotating shaft 9 rotatably supported by the front bracket 4 and rear bracket 5 through bearings 7, 8. An end portion of the rotating shaft 9 is projected from the front bracket 4 and a pulley 10 is fixed to a front end portion thereof. Further, other end portion of the rotating shaft 9 is projected from the rear bracket 5 and a front end portion thereof is integrated with two pieces of slip rings 11. The field wiring 2*a* wound around the rotor 2 is connected to a field terminal 13 fixed to the rear bracket 5 via the slip rings 11 and brushes 12.

The magnetic pole position detecting sensor 6 is coaxially installed with the rotating shaft 9 at other end portion of the rotating shaft 9 for detecting a current position of the magnetic pole of the rotating shaft 9 (rotor 2). Further, in addition to other than the magnetic pole position detecting sensor 6, an outer side of the rear bracket 5 is provided with the brushes 12 brought into sliding contact with the slip rings 11 and covered by a rear cover 14. The rear cover is fixed to the rear bracket 5 by a screw 15.

According to the vehicular starting and charging rotary electric machine according to the related art as described above, in order to interchange the brush 12, there is carried out a procedure of removing a rear cover 14 from the rear bracket 5 by detaching a screw 15, taking out the brush 12 after taking out the magnetic pole position detecting sensor 6, interchanging the brush 12 by a new one of the brush 12 and thereafter attaching the magnetic pole position detecting sensor 6 again. However, in order to promote detection accuracy, the magnetic pole position detecting sensor 6 is required high accuracy in a position of attachment relative to the magnetic pole of the rotor 2. Therefore, there is a problem that once the magnetic pole position detecting sensor 6 is detached, operation of attaching the magnetic position detecting sensor 6 again and readjusting a position of installing the magnetic pole position detecting sensor 6 is very troublesome to make operation of interchanging the brush 12 difficult.

SUMMARY OF THE INVENTION

The invention has been carried out in order to resolve the above-described problem and it is an object thereof to provide a vehicular starting and charging rotary electric machine capable of easily carrying out operation of interchanging a brush.

According to a first aspect of the invention, there is provided a vehicular starting and charging rotary electric machine serving as an electric machine or generating machine, having a rotor, a stator, a bracket, a brush, and a magnetic pole position detecting sensor. The rotor has a field winding. The stator has a stator winding. The bracket supports the rotor and the stator. One end of the brush is brought into contact with the rotor to supply field current to the field winding of the rotor. The magnetic pole position detecting sensor is arranged coaxially with a rotating shaft of the rotor, for detecting a magnetic pole position of the rotor and functioning. The magnetic pole position detecting sensor is integrally fixed to the bracket.

Accordingly, the brush can be removed without detaching the magnetic pole position detecting sensor from the bracket, it is not necessary readjust the magnetic pole position detecting sensor by reattachment thereof and operation of interchanging the brush can easily be carried out.

DETAILED DESCRIPTION OF THE PREFERRED EMBODIMENTS

Embodiment 1

Figure 1:
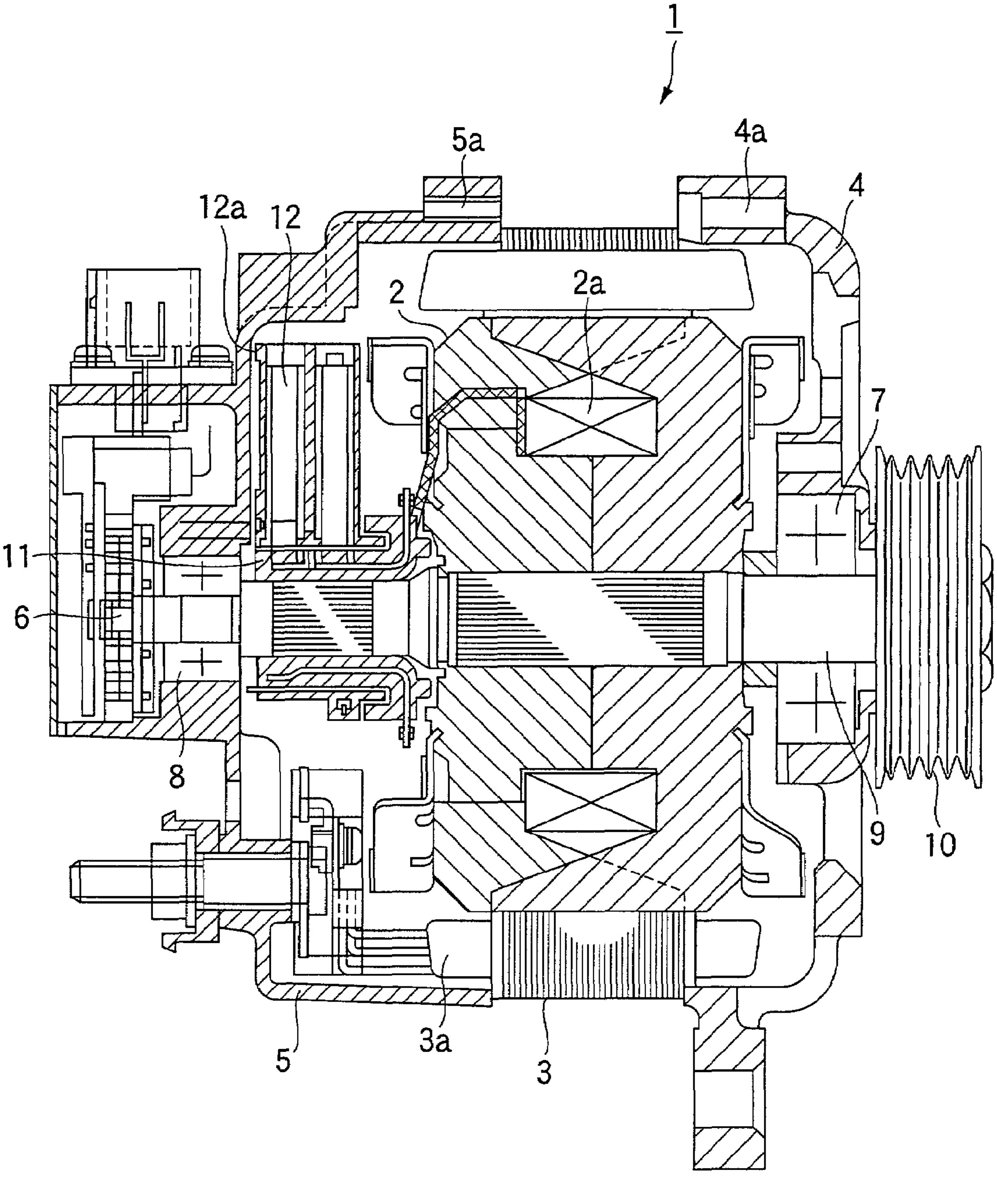
FIG. 1 is a sectional view showing a vehicular starting and charging rotary electric machine according to Embodiment 1 of the invention.
Figure 2:
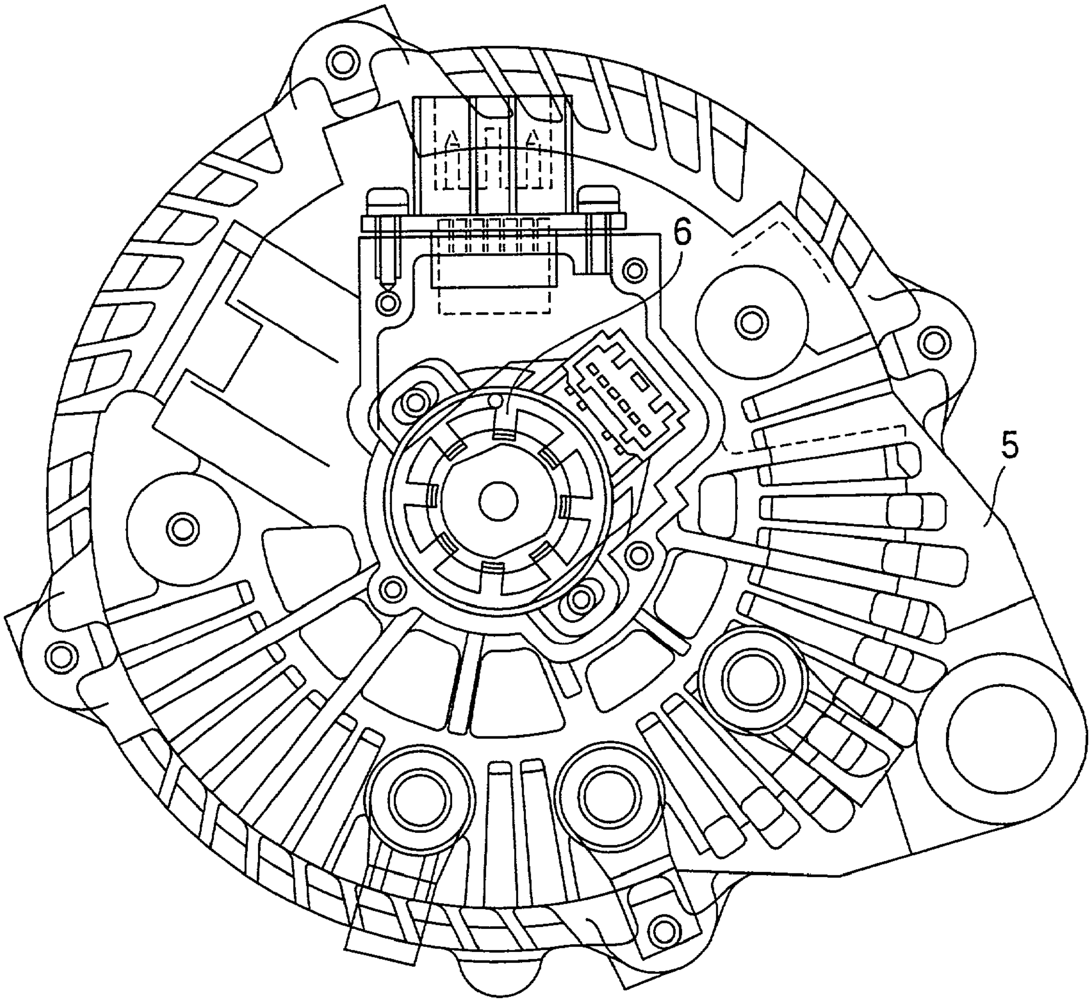
FIG. 2 is a front view of the vehicular starting and charging rotary electric machine according to Embodiment 1 of the invention.

FIG. 1 is a sectional view showing a vehicular starting and charging rotary electric machine according to Embodiment 1 of the invention. FIG. 2 is a front view viewing the vehicular starting and charging rotary electric machine in FIG. 1 from a side of a rear bracket thereof. In the drawings, a motor generator 1 includes a rotor 2 wound with a field winding 2*a*, a stator 3 wound with a three-phase stator winding 3*a*, a front bracket 4 and a rear bracket 5 containing the rotor 2 and stator 3, and a magnetic pole position detecting sensor 6 for detecting a rotational state of the rotor 2.

The rotor 2 has a rotating shaft 9 both end portions of which are rotatably supported by the front bracket 4 and the rear bracket 5 through bearings 7 and 8, respectively. One end portion of the rotating shaft 9 is projected from the front bracket 4 and a front end portion thereof is fixed with a pulley 10. Further, the other end portion of the rotating shaft 9 is integrated with two pieces of slip rings 11.

The magnetic pole position detecting sensor 6 arranged outside of the rear bracket is installed coaxially with the rotating shaft 9 on the other end side of the rotating shaft 9 and detects the rotating shaft 9, that is, a magnetic pole position of the rotor 2. Further, on an inner side of the rear bracket 5, brushes 12 brought into sliding contact with the slip rings 11 are installed to be held by a brush holder 12*a*.

Next, an explanation will be given of the operation. When field current is supplied to the field winding 2*a* via the brushes 12 and the slip rings 11, a magnetic flux is produced at a magnetic pole of the rotor 2. In operating as the motor, under such state, by supplying multi-phase alternating current to the multi-phase stator windings 3*a*, rotational force is produced in the rotor 2. The rotational force is transmitted to an engine side via the rotating shaft 9, the pulley 10 and a not illustrated belt (may be a chain or a toothed belt) to thereby start the engine.

After finishing to operate as the motor, the rotor 2 is driven by the engine via the pulley 10 and the rotating shaft 9, a rotary magnetic field is produced by the rotor 2, and power is produced at the multi-phase stator winding 3*a* to thereby operate as the generator.

In such a vehicular starting and charging rotary electric machine, according to the embodiment, the magnetic pole position detecting sensor 6 is arranged to be integrally attached to the rear bracket 5. In interchanging the brush 12, the brush 12 is taken out by removing the rear bracket 5. According to the embodiment, the magnetic pole position detecting sensor 6 is integral with the rear bracket 5 and therefore, the brush 12 can be removed without detaching the magnetic pole position detecting sensor 6.

Further, in assembling, a positional relationship between the stator 3 and the rear bracket 5 can be positioned by a hole 4*a* on a side of the front bracket 4 and a screw hole 5*a* on a side of the side of the rear bracket 5. The holes 4*a* and 5*a* are to be inserted a through bolt (not shown) to fasten and fix the front bracket 4 and rear bracket 5 sandwiching the stator 3 in an axial direction. Therefore, it is not necessary to readjust the magnetic pole position detecting sensor 6 by reattachment thereof and operation of interchanging the brush 12 can easily be carried out.

Embodiment 2

Figure 3:
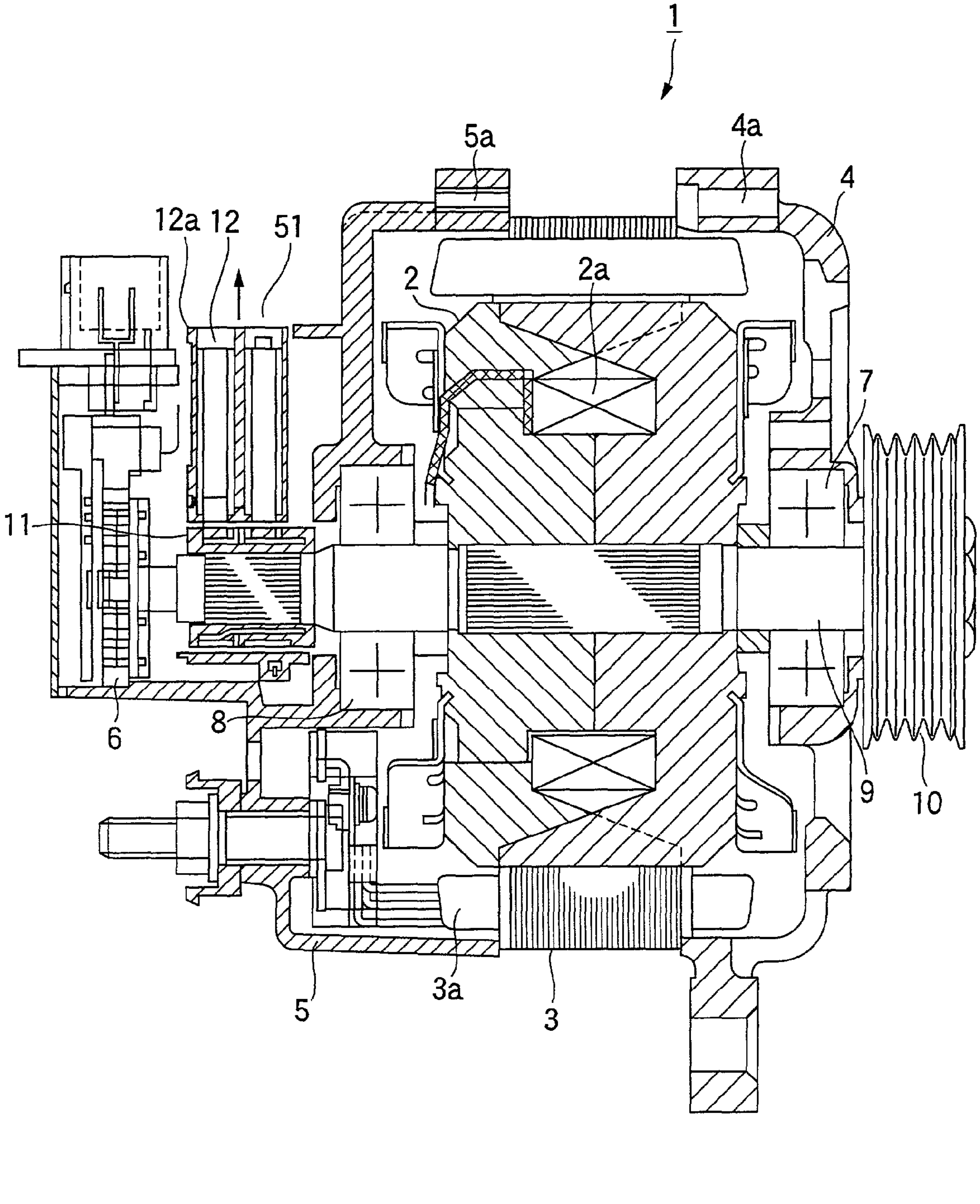
FIG. 3 is a sectional view showing a vehicular starting and charging rotary electric machine according to Embodiment 2 of the invention.

FIG. 3 is a sectional view showing a vehicular starting and charging rotary electric machine according to Embodiment 2 of the invention. Both of the magnetic pole position detecting sensor 6 and the brush 12 are arranged at outside of the rear bracket 5. Further, the rear bracket 5 has an opening portion 51 for taking out the brush 12 in a diameter direction. Although the magnetic pole position detecting sensor 6 is arranged on further outer side of the brush 12 in the axial direction, when the brush 12 is taken out from the opening portion 51 of the rear bracket 5 along with the brush holder 12*a*, only the brush 12 can be removed without being influenced by a state of installing the magnetic pole position detecting sensor 6. Further, a similar effect is achieved naturally by applying the opening portion 51 to Embodiment 1, described above.

Embodiment 3

Figure 4:
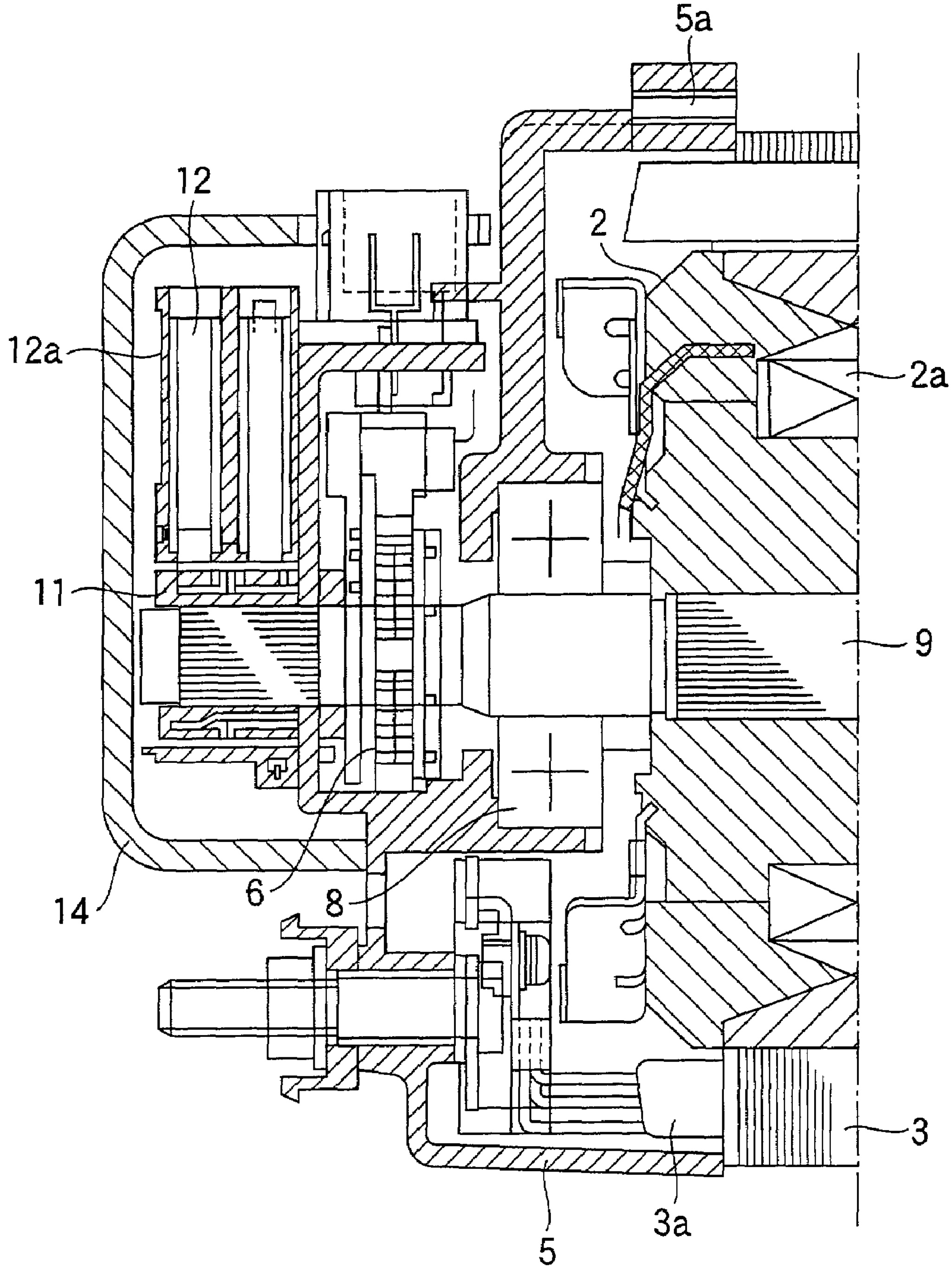
FIG. 4 is a sectional view enlarging portions of attaching a magnetic pole position detecting sensor and a brush of a vehicular starting and charging rotary electric machine according to Embodiment 3 of the invention.

FIG. 4 is a sectional view enlarging portions of attaching the magnetic pole position detecting sensor and the brush of a vehicular starting and charging rotary electric machine according to Embodiment 3 of the invention. Both of the magnetic pole position detecting sensor 6 and the brush 12 are arranged on the outer side of the rear bracket 5. Further, the brush 12 is arranged on further outer side of the magnetic pole position detecting sensor 6 in the axial direction and a rear cover 14 is provided to surround the magnetic pole position detecting sensor 16 and the brush 12. The brush 12 is arranged on the outer side of the rear bracket 5 and arranged on further outer side of the magnetic pole position detecting sensor 6 in the axial direction and therefore, the brush 12 can be taken out by only detaching the rear cover 14 and operation of interchanging the brush 12 can easily be carried out.

Embodiment 4

Figure 5:
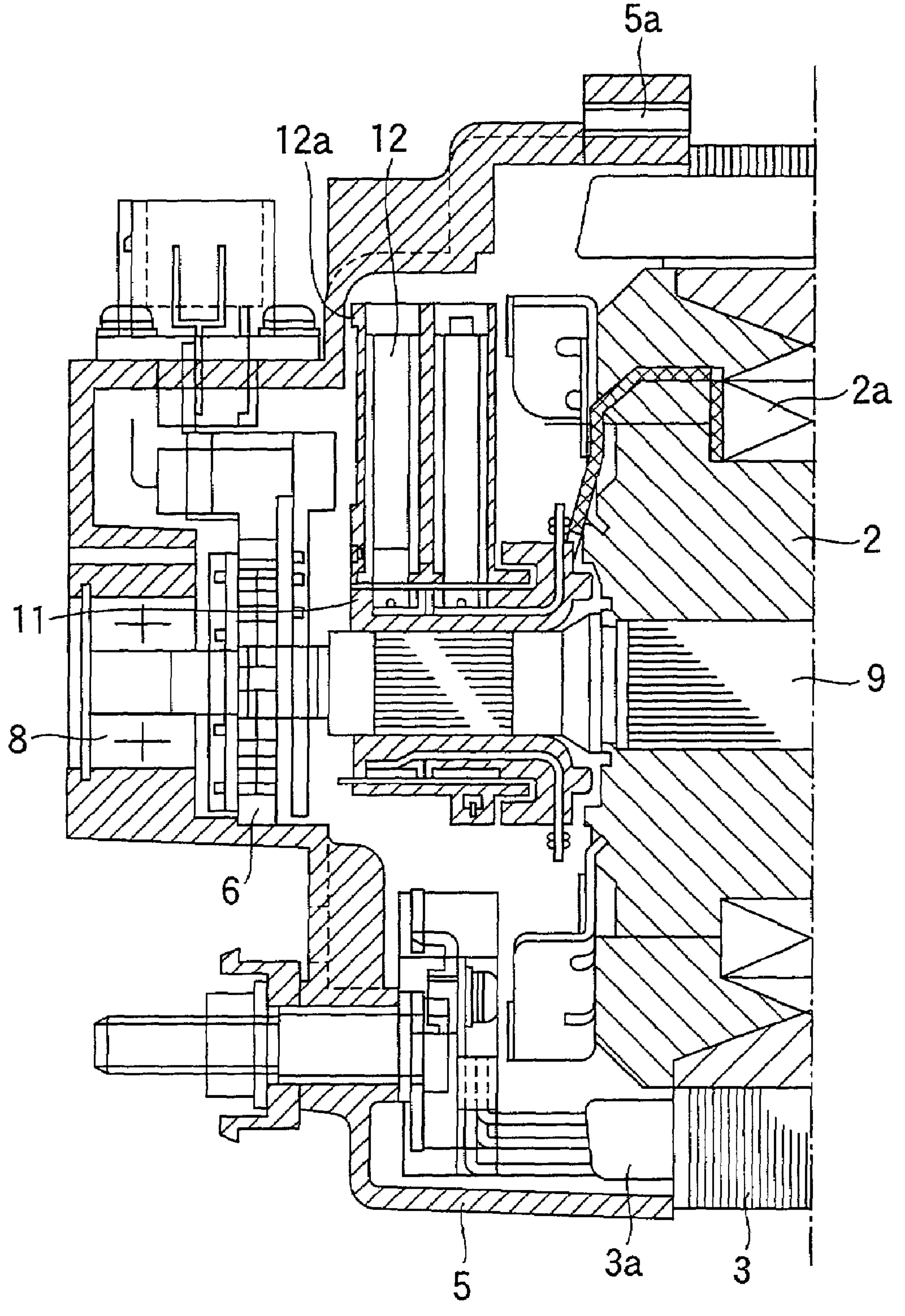
FIG. 5 is a sectional view enlarging portions of attaching a magnetic pole position detecting sensor and a brush of a vehicular starting and charging rotary electric machine according to Embodiment 4 of the invention.

FIG. 5 is a sectional view enlarging portions of attaching the magnetic pole position detecting sensor and the brush of a vehicular starting and charging rotary electric machine according to Embodiment 4 of the invention. Both of the magnetic pole position detecting sensor 6 and the brush 12 are arranged on an inner side of the rear bracket 5. The magnetic pole position detecting sensor 6 is integral with the rear bracket 5 and therefore, in interchanging the brush 12, even when the rear bracket 5 is removed, the brush 12 can be removed without detaching the magnetic pole position detecting sensor 6 from the bracket.

Further, in assembling, the positional relationship between the stator 3 and the rear bracket 5 can be positioned by the hole 4*a* on the side of the front bracket 4 and the screw hole 5*a* on the side of the rear bracket 5 of a through bolt, not illustrated, for fastening to fix the front bracket 4 and the rear bracket 5 sandwiching the stator 3 in the axial direction and therefore, it is not necessary to readjust the magnetic pole position detecting sensor 6 by reattachment thereof and operation of interchanging the brush 12 can easily be carried out. Further, since the brush 12 is arranged on the inner side of the rear bracket 12 and therefore, the brush 12 can be protected against an external factor.

Further, when the brush 12 is taken out from the diameter direction along with the brush holder 12*a* by providing the opening portion 51 of the rear bracket 5 according to Embodiment 2, only the brush 12 can be removed without removing the rear bracket 5 and the front bracket 4 and operation of interchanging the brush can be carried out further easily.

Embodiment 5

Figure 6:
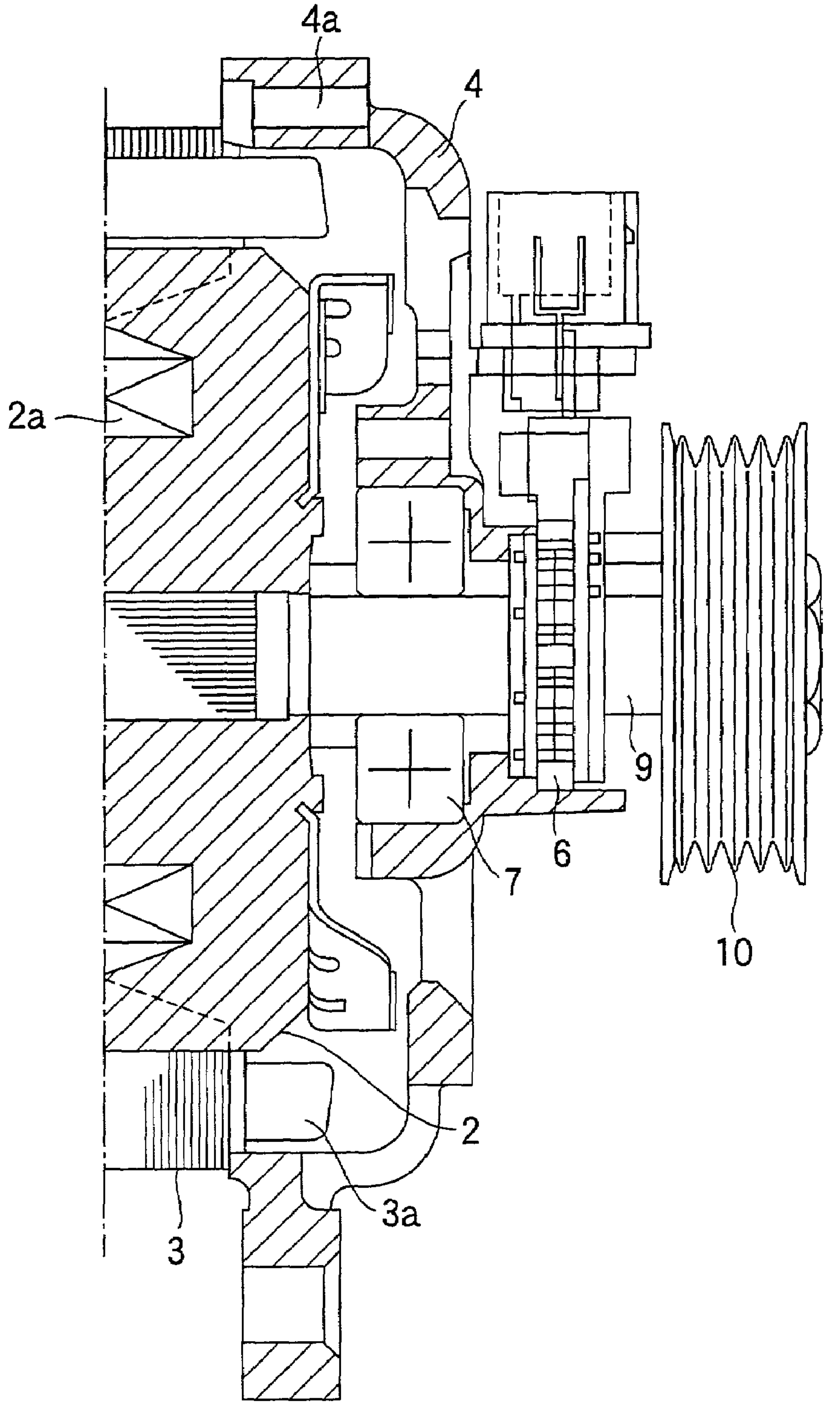
FIG. 6 is a sectional view enlarging a portion of attaching a magnetic pole position detecting sensor of a vehicular starting and charging rotary electric machine according to Embodiment 5 of the invention.

FIG. 6 is a sectional view enlarging a portion of attaching the magnetic pole position detecting sensor of a vehicular starting and charging rotary electric machine according to Embodiment 5 of the invention. Although according to the above-described respective embodiments, the magnetic pole position detecting sensor 6 and the brush 12 are arranged at the end portion of the rotary shaft 9 on a side opposed to the pulley 10, according to the embodiment, the brush 12 is arranged on a side opposed to the pulley 10 and the magnetic pole position detecting sensor 6 is arranged at the end portion of the rotating shaft 9 on the side of the pulley 10, respectively. Thereby, the magnetic pole position detecting sensor 6 and the brush 12 are arranged not to be proximate to each other but to be remote from each other and therefore, even when a worn powder of the brush 12 or the like is scattered, the magnetic pole position detecting sensor 6 is not influenced thereby and the brush 12 can be interchanged without being influenced by the state of installing the magnetic pole position detecting sensor 6. Further, although according to the embodiment, an explanation has been given of an example of arranging the brush 12 on the side opposed to the pulley 10 and arranging the magnetic pole position detecting sensor 6 on the side of the pulley 10, a similar effect is naturally achieved even when the arrangement is reversed.

Embodiment 6

Figure 7:
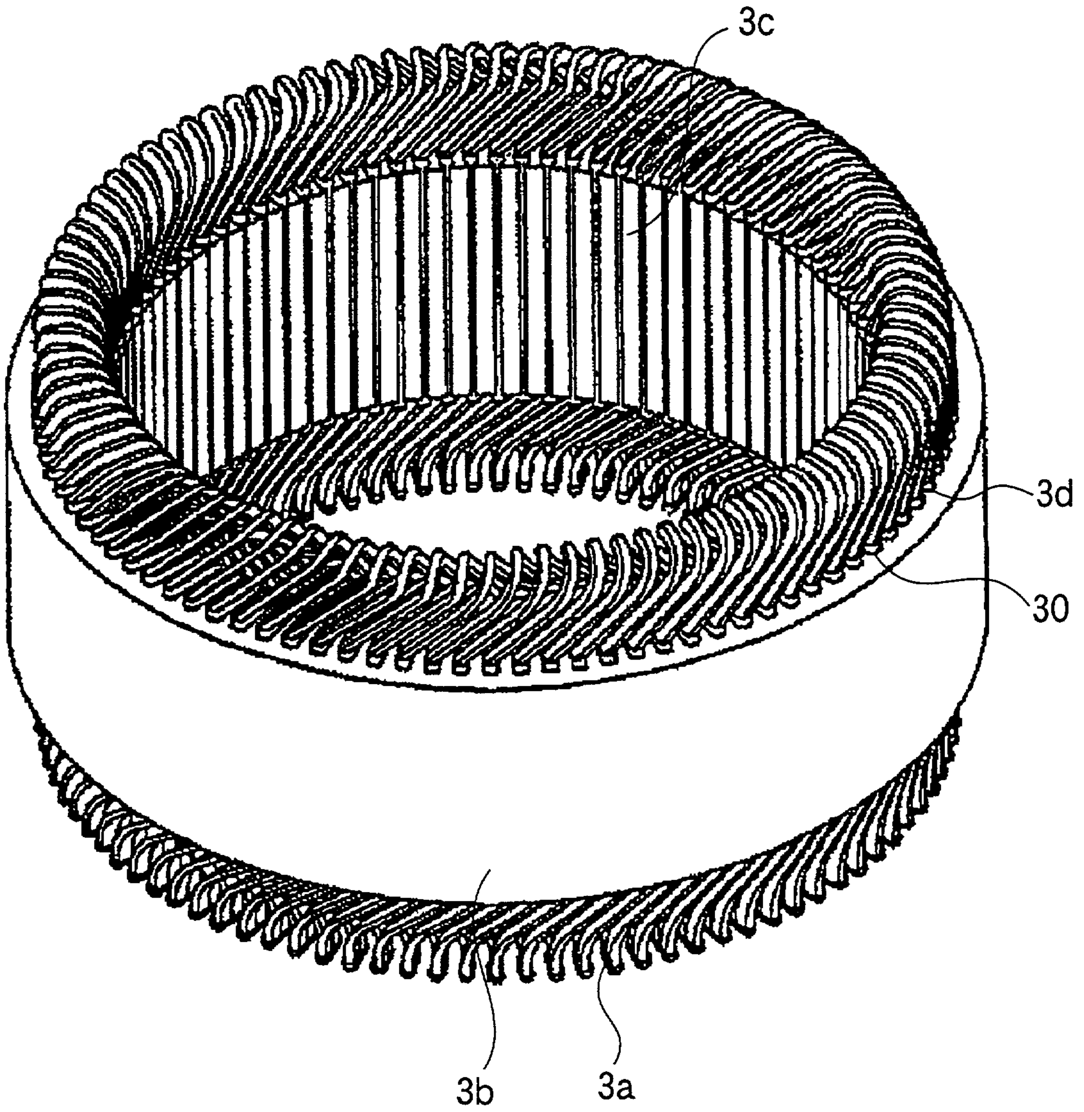
FIG. 7 is a perspective view showing a stator of a rotary electric machine according to Embodiment 6 of the invention.

FIG. 7 is a perspective view showing the stator of a vehicular starting and charging rotary electric machine according to Embodiment 6 of the invention. As shown in the drawing, the stator 3 is provided with a stator core 3*b* in a shape of a circular cylinder formed with a plurality of slots 3*d* extended in the axial direction by a predetermined pitch in a peripheral direction thereof, the stator winding 3*a* wound around the stator core 3*b* and insulating paper 3 mounted in the respective slots 3*d* for electrically insulating the stator winding 3*a* and the stator core 3*b*. According to the stator 3 shown in the drawing, since the coil end of the stator winding 3*a* is aligned, the coil end is shortened and a total length of the vehicular starting and charging rotary electric machine prolonged by installing the magnetic pole position detecting sensor 6 can be shortened.

Figure 8:
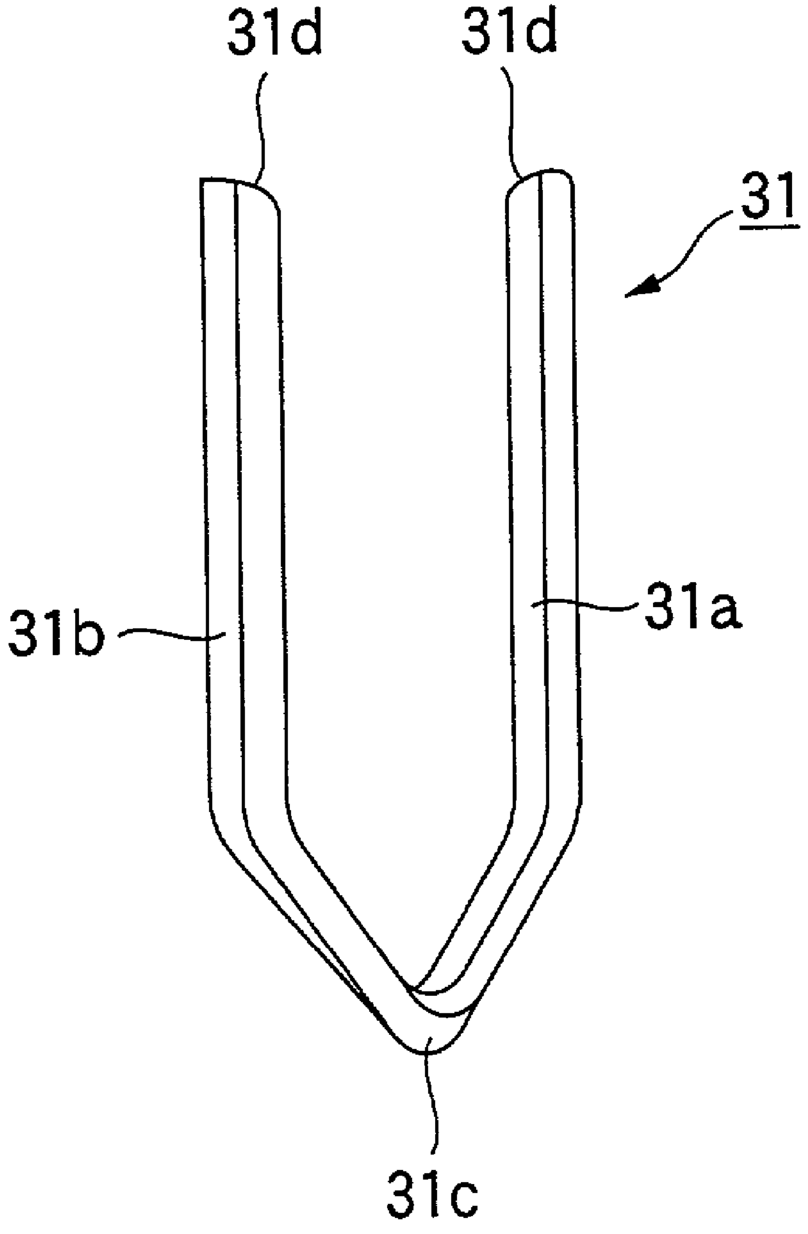
FIG. 8 is a perspective view showing a conductor segment for constituting a stator winding of the rotary electric machine according to Embodiment 6 of the invention.

Further, in order to realize the stator 3 of respective pole and respective phase 2, it is preferable to constitute the stator winding 3*a* by a conductor segment. FIG. 8 is a perspective view showing the conductor segment constituting the stator winding 5, showing a state before being integrated to the stator core 3*b*. In the drawing, the conductor segment 31 is formed substantially in a U-like shape by folding to bend a rod-like or a plate-like metal material (for example, copper) at a turn portion 31*c* and is constituted to include an inner layer side conductor 31*a* arranged from the turn portion 31*c* to an inner peripheral side of the slot 3*d* and an outer layer side conductor 31*b* arranged from the turn portion 31*c* to an outer peripheral side of the slot 3*d*.

Figure 9:
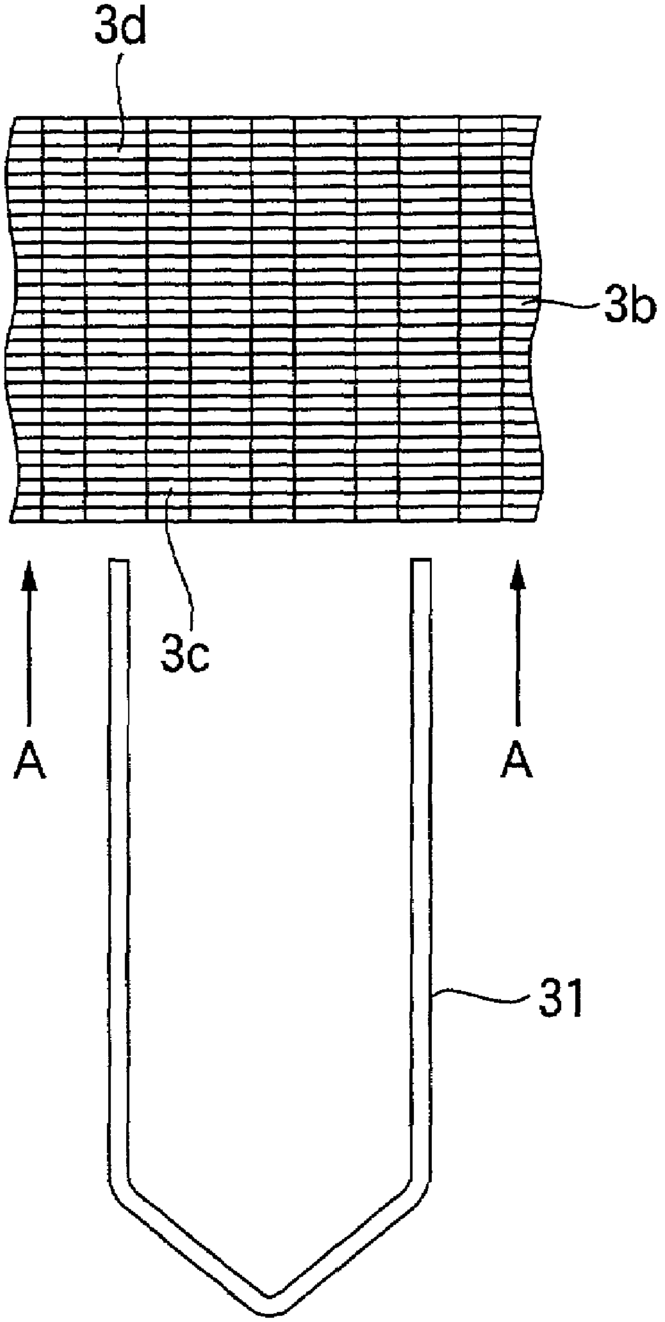
FIG. 9 is an explanatory view of a method of fabricating the stator winding of the rotary electric machine according to Embodiment 6 of the invention.
Figure 10:
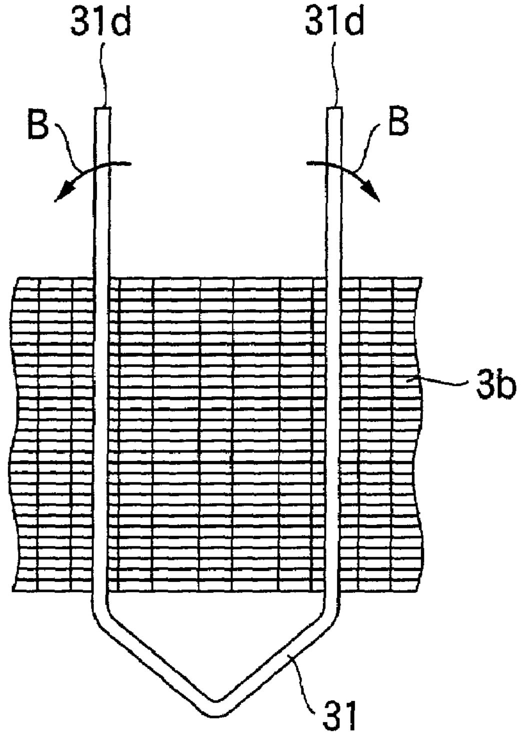
FIG. 10 is an explanatory view for explaining the method of fabricating the stator winding of the rotary electric machine according to Embodiment 6 of the invention.
Figure 11:
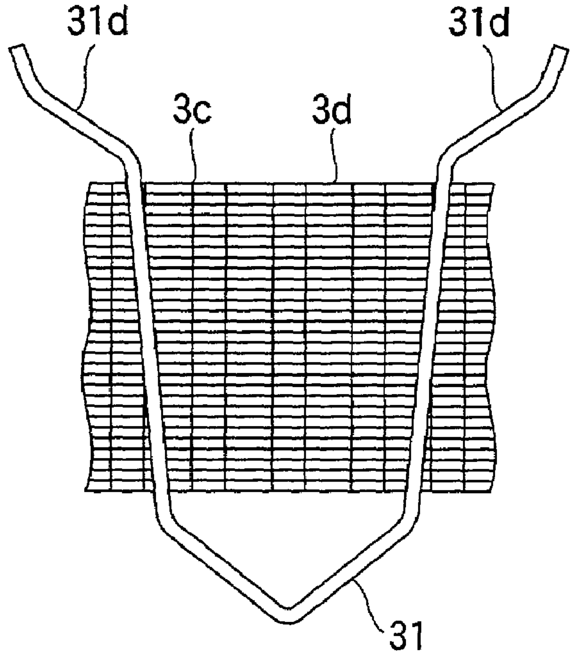
FIG. 11 is an explanatory view for explaining the method of fabricating the stator winding of the rotary electric machine according to Embodiment 6 of the invention.

FIG. 9 through FIG. 11 are explanatory views for explaining a method of fabricating the stator winding 3*a*. Further, the insulating paper 30 is omitted here. The insulating paper 30 is formed in a ring-like shape for one slot and is inserted into the slot 3*d* along the axial direction. After finishing to integrate the insulating paper 30 to the slot 3*d*, as shown by FIG. 9, the conductor segment 31 is inserted to the slog 3*d* in the axial direction as shown by an arrow mark A. After projecting an end portion 31*d* of the inserted conductor segment 31 from other side face of the slot 3*d*, as shown by FIG. 10, the end portion 31*d* is respectively bent in the peripheral direction of the stator core 3*b* (twisting) as shown by an arrow mark B to thereby bring about a state of FIG. 11 and is connected to the end portion 31*d* of the conductor segment 31 inserted into a different one of the slot 3*d*.

Further, according to the conductor segment 31, a similar effect is naturally achieved by adopting various conductor segments substantially in a J-like shape, substantially in a I-like shape and the like other than the substantially U-like shape shown in FIG. 8.

Embodiment 7

Figure 12:
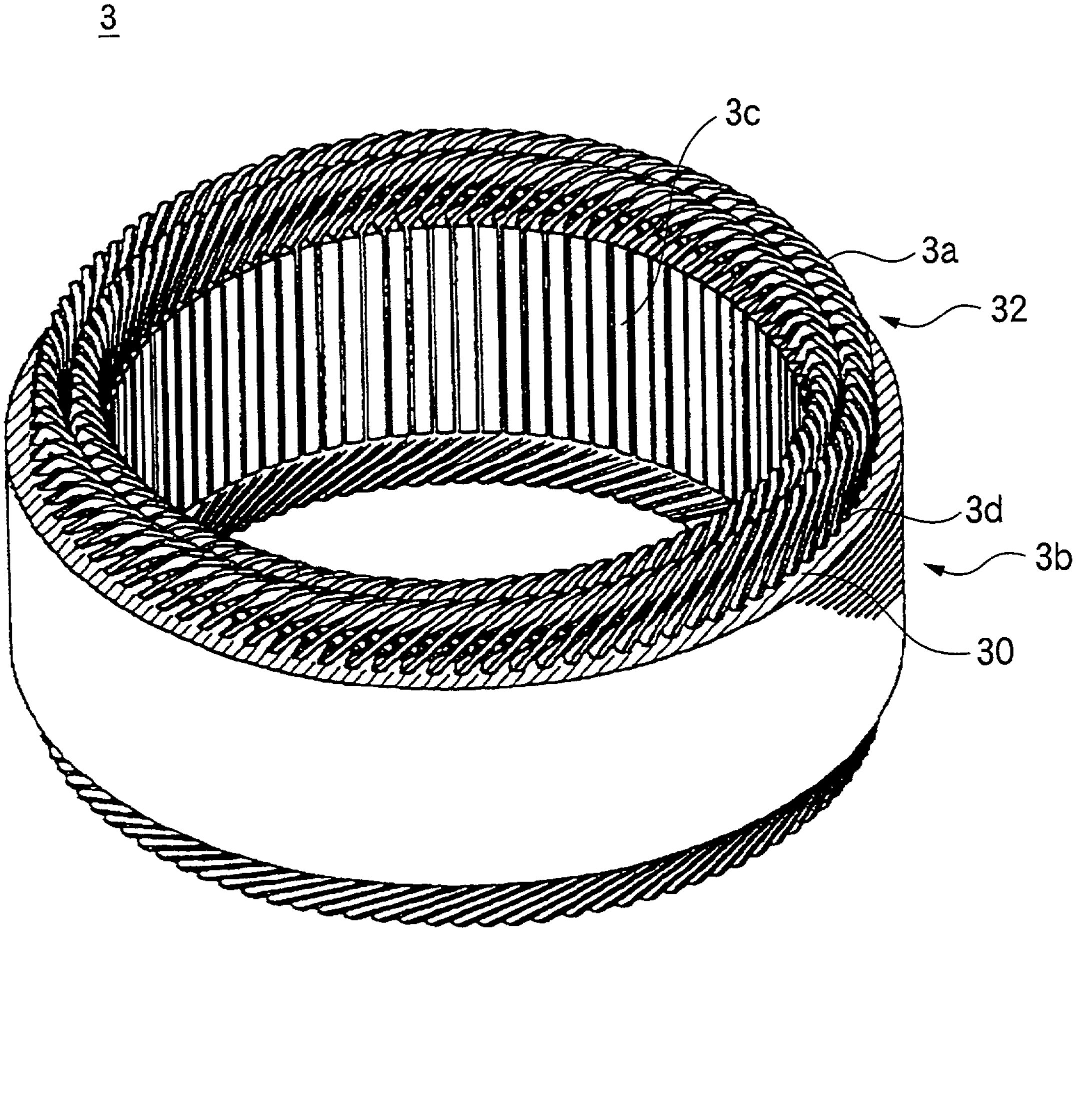
FIG. 12 is a perspective view showing a stator of a rotary electric machine according to Embodiment 7 of the invention.

Although according to Embodiment 6, mentioned above, an explanation has been given of constructing the constitution by using the conductor segment 31 as the stator winding 3*a*, the stator winding 3*a* may be constituted by a single wire line (continuous line). FIG. 12 is a perspective view showing a stator of a rotary electric machine according to Embodiment 7 of the invention.

As shown by FIG. 12, the stator 3 is provided with the stator core 3*b* comprising a laminated layer core in a shape of a circular cylinder formed with a plurality of the slots 3*b* extended in the axial direction at a predetermined pitch in the peripheral direction, the stator wiring 3*a* wound around the stator core 3*b* and the insulating paper 30 mounted in the respective slots 3*d* for electrically insulating the stator winding 3*a* and the stator core 3*b*. Further, the stator winding 3*a* is provided with a plurality of windings in each of which a single piece of the wire line 32 is folded back at outside of the slot 3*d* on an end face side of the stator core 3*b* and is wound by wave winding to alternately take an inner layer and an outer layer in a slot depth direction at inside of the slot 3*d* at every predetermined number of slots.

Figure 13:
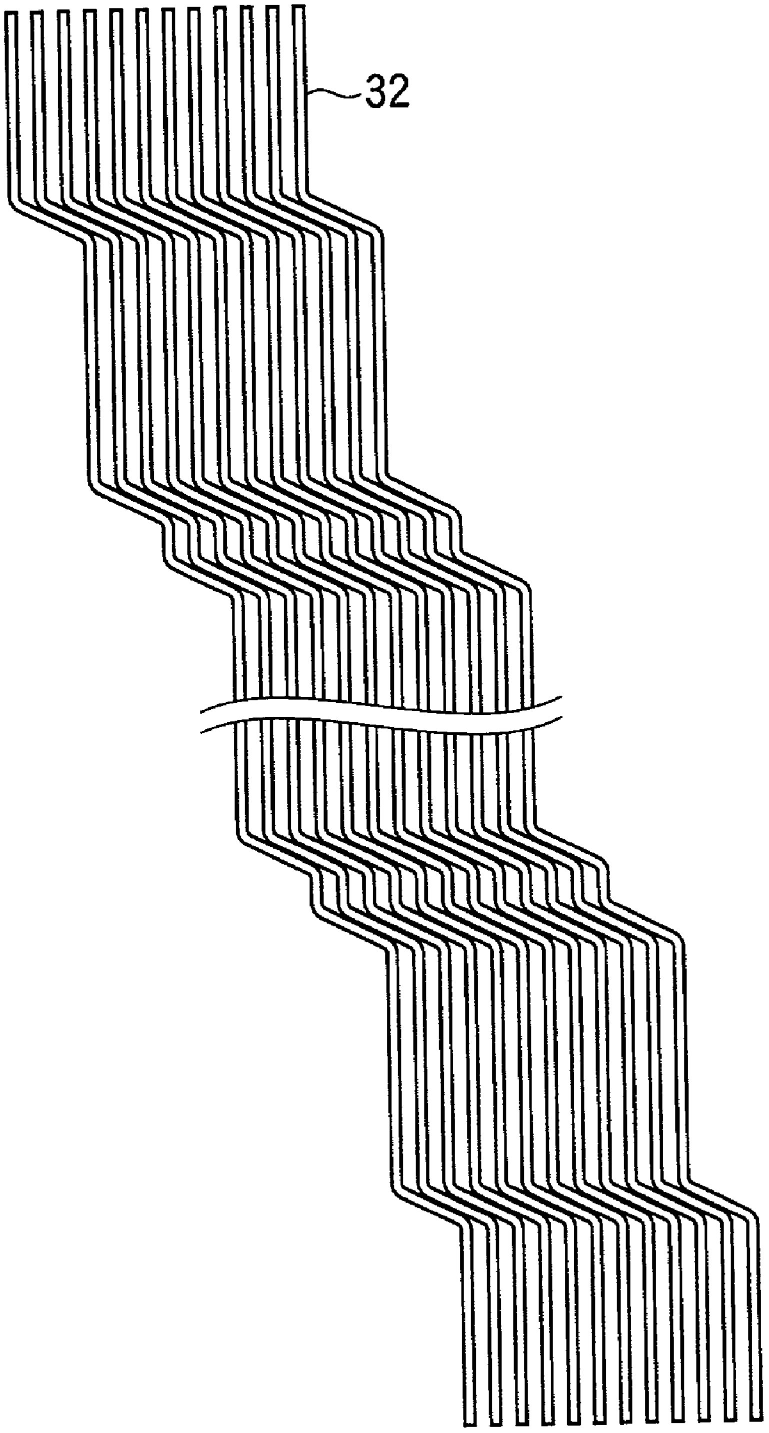
FIG. 13 is an explanatory view for explaining a method of fabricating a stator winding of the rotary electric machine according to Embodiment 7 of the invention.
Figure 14:
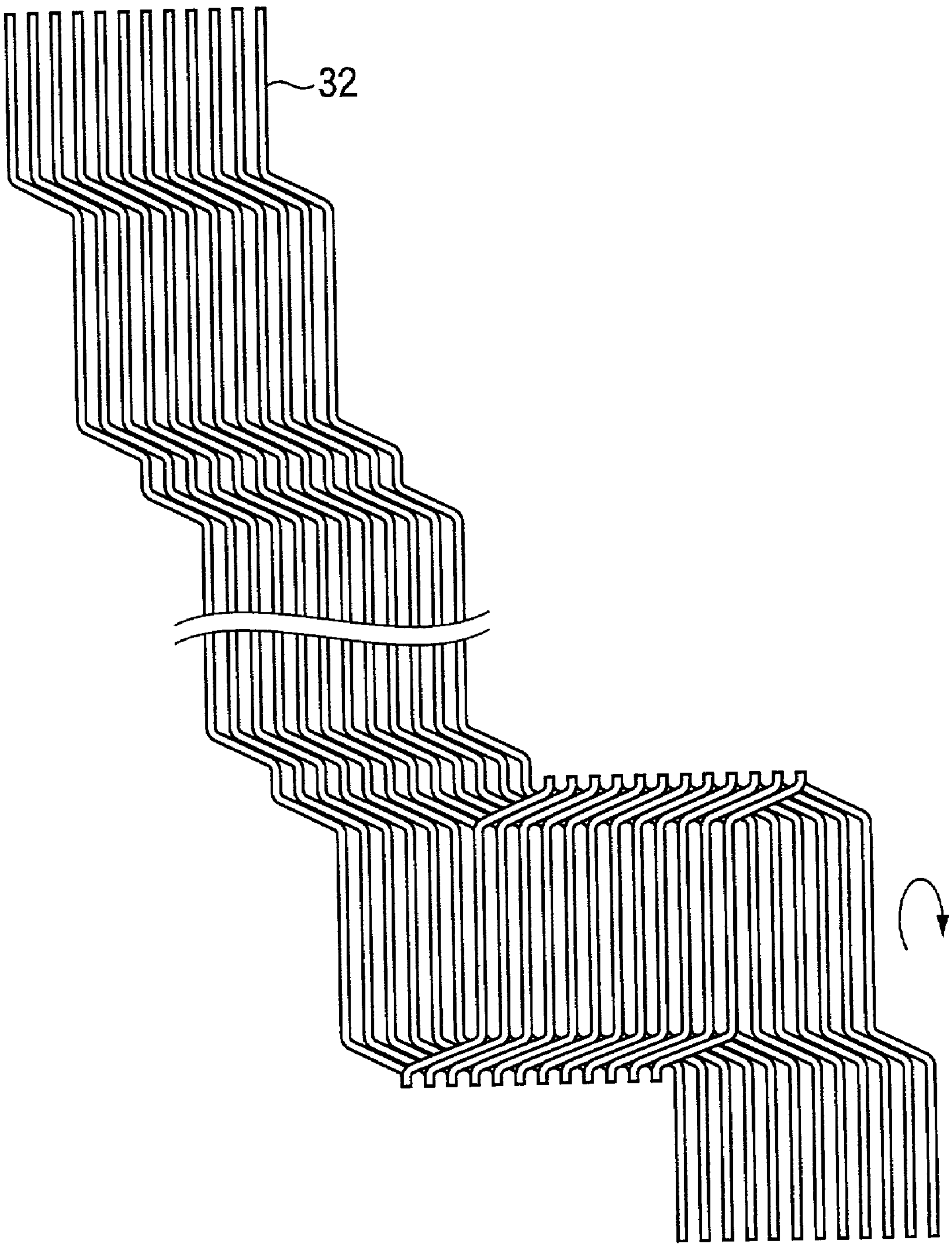
FIG. 14 is an explanatory view for explaining the method of fabricating the stator winding of the rotary electric machine according to Embodiment 7 of the invention.
Figure 15:
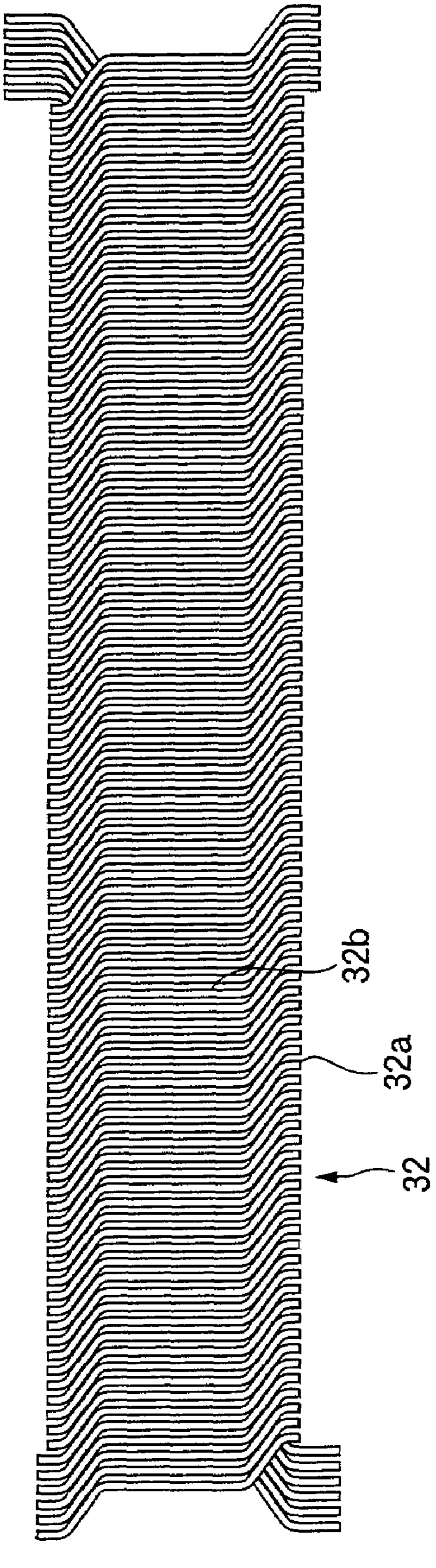
FIG. 15 is an explanatory view for explaining the method of fabricating the stator winding of the rotary electric machine according to Embodiment 7 of the invention.
Figure 16:
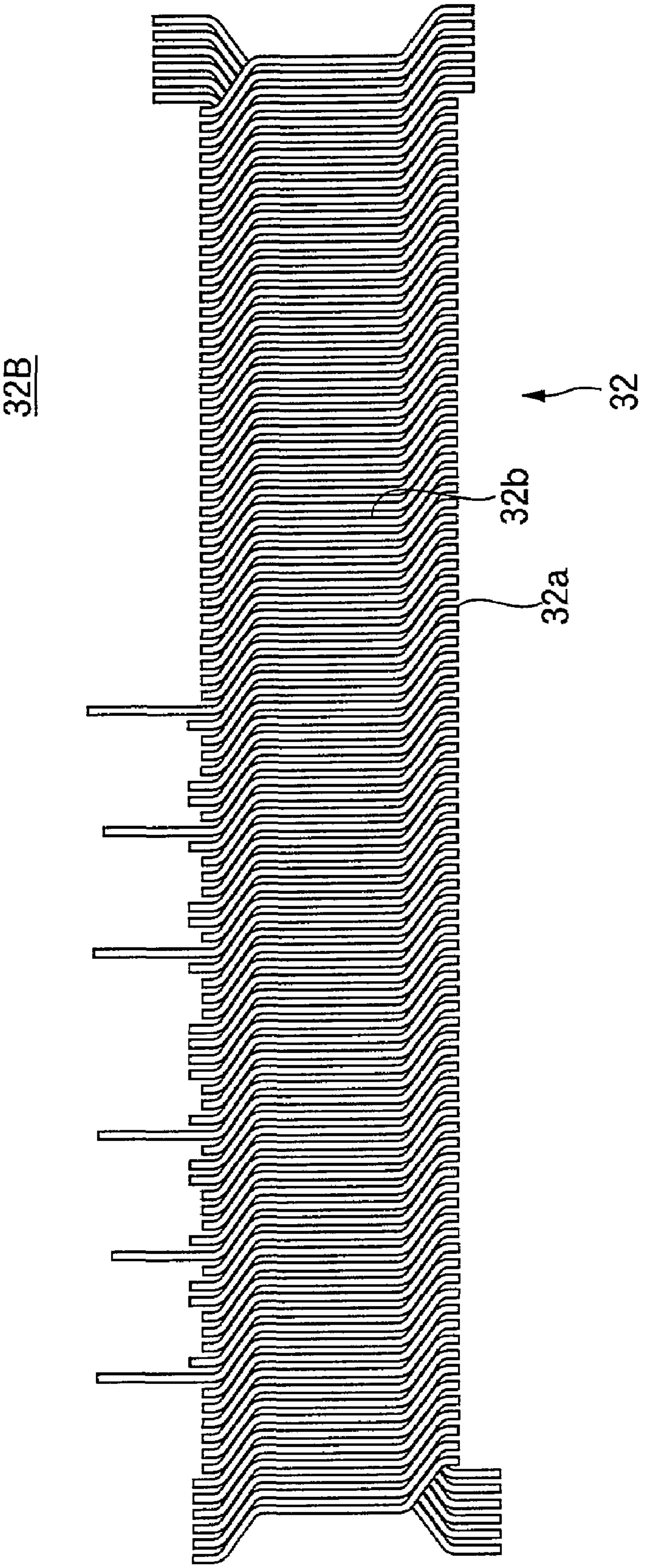
FIG. 16 is an explanatory view for explaining the method of fabricating the stator winding of the rotary electric machine according to Embodiment 7 of the invention.

Next, a specific explanation will be given of a method of fabricating the stator 3 in reference to FIG. 13 through FIG. 18. First, as shown by FIG. 13, 12 pieces of long wire lines 32 are formed in a thunderbolt-like shape by folding to bend the wire lines simultaneously on the same plane. Successively, as shown by an arrow mark in FIG. 14, the wire lines are folded in a right angle direction by a jig to thereby fabricate a wire line group 32A as shown by FIG. 15. Further, similarly, as shown by FIG. 16, a wire line group 32B having a crossover line and a lead line is fabricated. The wire line groups 32A and 32B are constituted by aligning 6 pairs of wire line pairs aligned with two pieces of wire lines 32 formed in such a pattern by being shifted by 6 slot pitch as shown by FIG. 18 to overlap straight line portions 32B, by shifting by 1 slot pitch. Further, 6 pieces of end portions of the wire line 32 are extended to both sides of both ends of the wire line group 32A and 32B. Further, turn portions 32*a* are arranged to align on both side portions of the wire line groups 32A and 32B.

Figure 17:
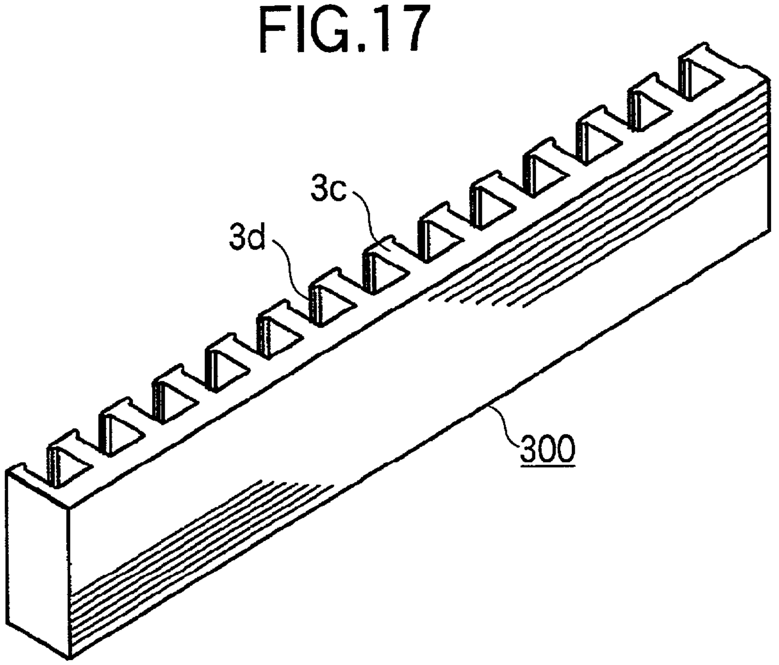
FIG. 17 is an explanatory view for explaining the method of fabricating the stator winding of the rotary electric machine according to Embodiment 7 of the invention.
Figure 18:
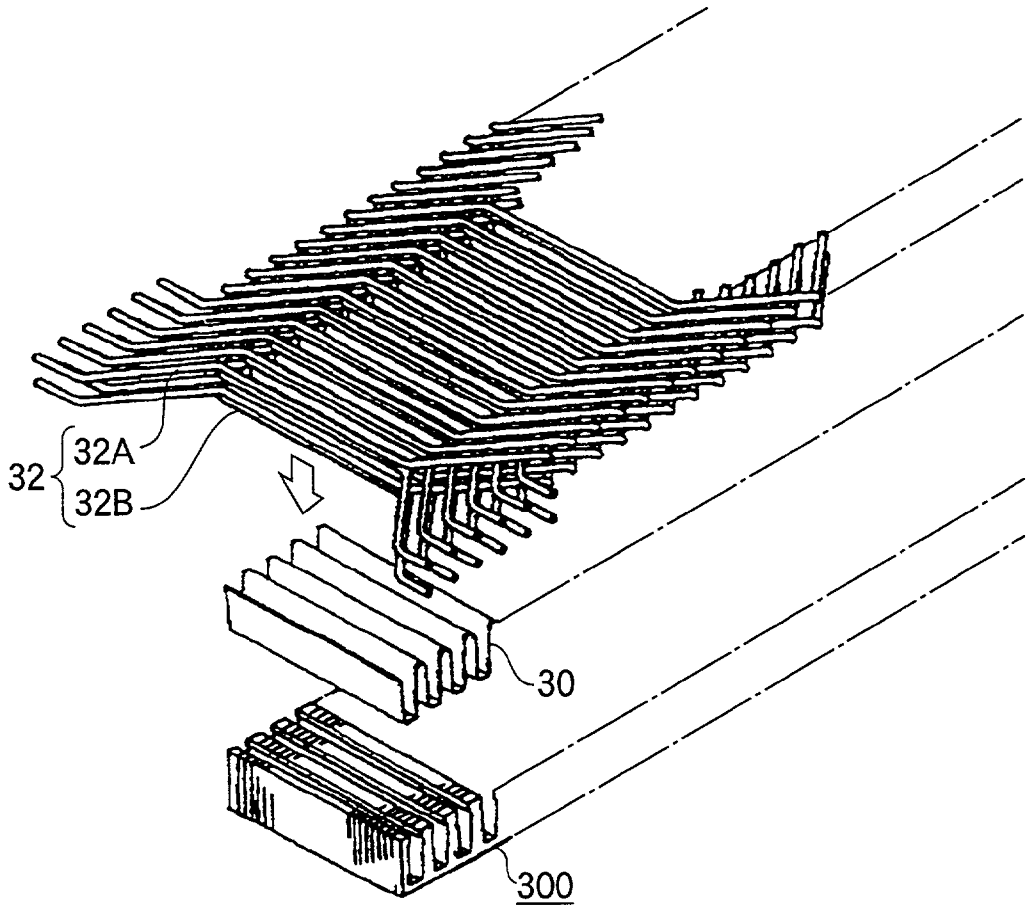
FIG. 18 is an explanatory view for explaining the method of fabricating the stator winding of the rotary electric machine according to Embodiment 7 of the invention.
Figure 19:
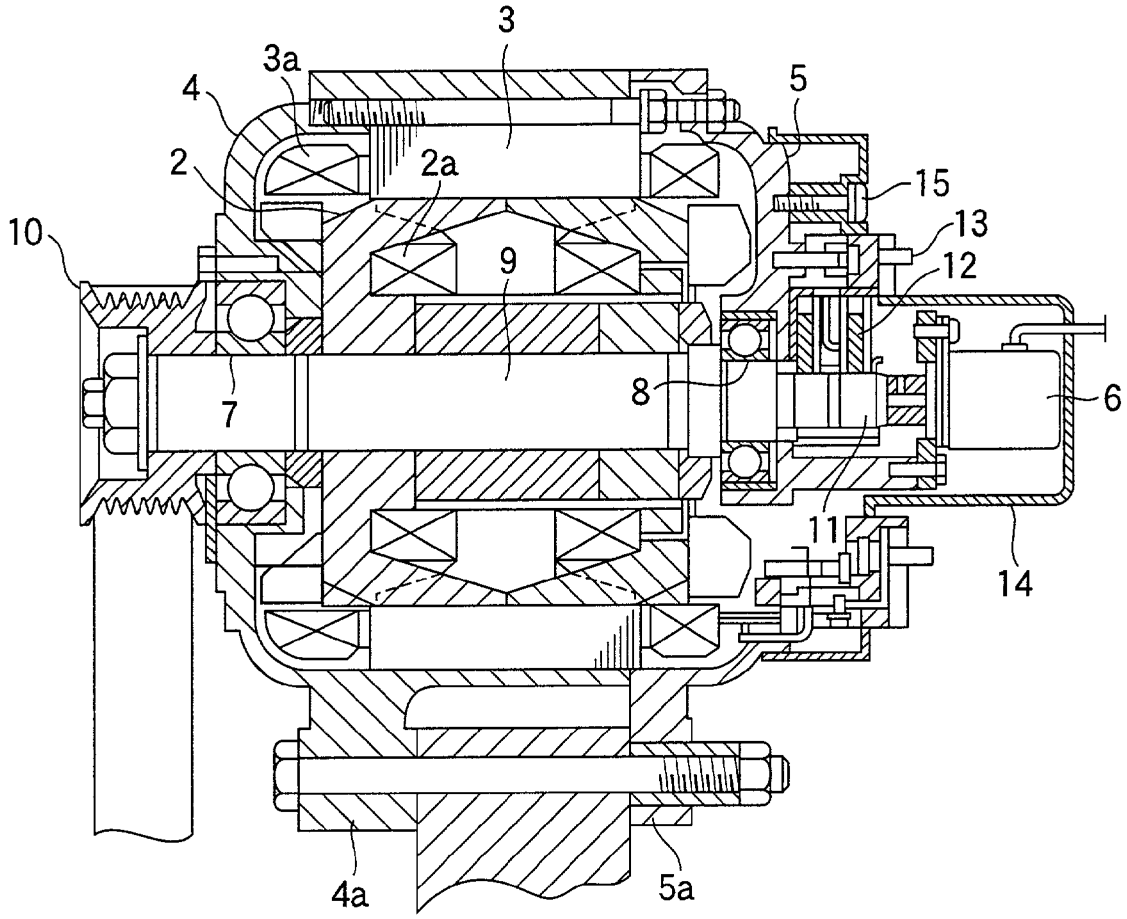
FIG. 19 is a sectional view showing a vehicular starting and charging rotary electric machine according to the related art.

Meanwhile, there are laminated a predetermined number of sheets of main laminated layer plates each formed with slots 3*d* and tees 3*c* in a trapezoidal shape by a predetermined pitch, predetermined positions of outer peripheral portions thereof are welded by laser welding in a laminating direction to thereby fabricate a laminated layer core 300 substantially in a parallelepiped as shown by FIG. 17.

Further, the insulating paper 30 and the two wire line groups 32A and 32B are laminated to mount to the laminated layer core 300. Successively, the laminated layer core 300 is rounded and end faces thereof are brought into contact to each other and welded to each other to thereby provide the stator 3 in the shape of the circular cylinder as shown in FIG. 12.

The stator winding 3*a* according to the embodiment is the single wire line 32 (continuous line) and therefore, a number of bond portions is smaller than that by forming the stator winding 3*a* by bonding the conductor segments 31 as in Embodiment 6 and therefore, the coil end of the stator winding 3*a* can be lowered and the stator 3 having a short total length can easily be fabricated.

As described above, according to a first aspect of the invention, there is provided a vehicular starting and charging rotary electric machine including a rotor having a field winding, a stator having a stator winding, a bracket for supporting the rotor and the stator, a brush one end of which is brought into contact with the rotor for supplying field current to the field winding of the rotor, and a magnetic pole position detecting sensor arranged coaxially with a rotating shaft of the rotor for detecting a magnetic pole position of the rotor and functioning as a motor or a generator, and the magnetic pole position detecting sensor is integrally fixed to the bracket. Therefore, the brush can be removed without detaching the magnetic pole position detecting sensor from the bracket, it is not necessary readjust the magnetic pole position detecting sensor by reattachment thereof and operation of interchanging the brush can easily be carried out.

Further, according to a second aspect of the invention, the magnetic pole position detecting sensor is arranged on an outer side in an axial direction of the brush and therefore, the brush can be removed without being influenced by the state of installing the magnetic pole position detecting sensor and there is achieved an effect capable of easily carrying out operation of interchanging the brush.

Further, according to a third aspect of the invention described, the magnetic pole position detecting sensor is arranged at one end of a rotor shaft and the brush is arranged at other end thereof, respectively and therefore, the brush can be removed without being influenced by the state of installing the magnetic pole position detecting sensor and there is achieved an effect capable of easily carrying out operation of interchanging the brush.

Further, according to a fourth aspect of the invention described, the brush is arranged on an inner side of the bracket and therefore, there is achieved an effect capable of protecting the brush against an external factor.

Further, according to a fifth aspect of the invention, the brush is arranged on an outer side of the bracket and therefore, the brush can be removed without disassembling the bracket and there is achieved an effect capable of easily carrying out operation of interchanging the brush.

Further, according to a sixth aspect of the invention, a brush holder fixed to the bracket for holding the brush is constituted to be capable of interchanging the brush attachably and detachably from a diameter direction thereof and therefore, only the brush can be removed without being influenced by the state of installing the magnetic pole position detecting sensor and there is achieved an effect of capable of easily carrying out operation of interchanging the blush.

Further, according to a seventh aspect of the invention described, the stator winding of the stator includes a coil end extended outwardly from an end face of a stator core and the coil end is arranged by aligning the stator core in a peripheral direction and therefore, the coil end is lowered and there is achieved an effect capable of shortening a total length of the rotary electric machine prolonged by an amount of the magnetic pole position detecting sensor.

Further, according to an eighth aspect of the invention described, the stator winding of the stator is constituted by connecting a plurality of conductor segments and therefore, there is achieved an effect capable of fabricating the stator having a short total length simply and conveniently.

Further, according to a ninth aspect of the invention, the stator winding of the stator includes a plurality of windings folded back at outside of a slot on a side of the end face of the stator core and wound to alternately take an inner layer and an outer layer in a slot depth direction at inside of the slot at every predetermined number of the slots and portions of turning the coil wires folded back at outside of the slots on the side of the end face of the stator core, are aligned in the peripheral direction to constitute a group of the coil ends and therefore, there can be constructed a constitution having a small number of bond portions in the stator winding and there is achieved an effect capable of fabricating the stator having the short total length simply and conveniently.

What is claimed is:

1. A vehicular starting and charging rotary electric machine sewing as an electric machine or generating machine, comprising:

a rotor having a field winding;

a stator having a stator winding;

a bracket for supporting the rotor and the stator;

a brush one end of which is brought into contact with the rotor for supplying field current to the field winding of the rotor;

a brush holder for holding said brush; and a magnetic pole position detecting sensor arranged coaxially with a rotating shaft of the rotor, for detecting a magnetic pole position of the rotor, wherein the magnetic pole position detecting sensor is integrally fixed on the bracket, wherein said brush and said brush holder are arranged inside said bracket, and said magnetic pole position detecting sensor is arranged outside said bracket, and wherein said brush is in sliding contact with at least one slip ring, the slip ring being disposed at a same side of the rotor as the magnetic pole position detecting sensor.

2. The vehicular starting and charging rotary electric machine according to claim 1, wherein the magnetic pole position detecting sensor is arranged on an outer side in an axial direction of the brush.

3. The vehicular starting and charging rotary electric machine according to claim 1, wherein the stator winding of the stator includes a coil end extended outwardly from an end face of a stator core; and wherein the coil end is arranged by aligning the stator core in a peripheral direction.

4. The vehicular starting and charging rotary electric machine according to claim 3, wherein the stator winding of the stator is constituted by connecting a plurality of conductor segments.

5. The vehicular starting and charging rotary electric machine according to claim 3, wherein the stator winding of the stator includes a plurality of windings folded back at outside of a slot on a side of the end face of the stator core and wound to alternately be positioned at an inner layer and an outer layer in a slot depth direction inside of the slot at every predetermined number of the slots; and wherein portions of turning the coil wires folded back at outside of the slots on the side of the end face of the stator core, are aligned in the peripheral direction to constitute a group of the coil ends.

6. The vehicular starting and charging rotary electric machine according to claim 1, wherein the magnetic pole position detecting sensor and the brush are arranged on a same side of the vehicular starting and charging rotary electric machine, with respect to an axial direction of the rotating shaft.

7. A vehicular starting and charging rotary electric machine serving as an electric machine or generating machine, comprising:

a rotor having a field winding;

a stator having a stator winding;

a bracket for supporting the rotor and the stator;

a brush one end of which is brought into contact with the rotor for supplying field current to the field winding of the rotor;

a brush holder for holding said brush; and a magnetic pole position detecting sensor arranged coaxially with a rotating shaft of the rotor, for detecting a magnetic pole position of the rotor, wherein the magnetic pole position detecting sensor is integrally fixed to the bracket, wherein said magnetic pole position detecting sensor is arranged outside said bracket, and wherein the brush is arranged on an outer side of the bracket, wherein the brush is detachably interchanged from a diameter direction of the brush holder.

* * * * *